(12) United States Patent
Neary (10) Patent No.: US 8,776,077 B2
(45) Date of Patent: Jul. 8, 2014

(54) METHOD FOR MULTITHREADING AN APPLICATION USING PARTITIONING TO ALLOCATE WORK TO THREADS

(75) Inventor: Paul Neary, Greystones (IE)

(73) Assignee: Oracle America, Inc., Redwood City, CA (US)

( * ) Notice: Subject to any disclaimer, the term of this patent is extended or adjusted under 35 U.S.C. 154(b) by 1464 days.

(21) Appl. No.: 12/061,123

(22) Filed: Apr. 2, 2008

(65) Prior Publication Data

US 2009/0254907 A1  Oct. 8, 2009

(51) Int. Cl.
*G06F 9/46* (2006.01)

(52) U.S. Cl.
USPC .......................... 718/106; 718/100; 718/107

(58) Field of Classification Search
None
See application file for complete search history.

(56) References Cited

U.S. PATENT DOCUMENTS

| | | | |
|---|---|---|---|
| 6,823,351 B1 * | 11/2004 | Flood et al. ........................ 1/1 |
| 8,037,476 B1 * | 10/2011 | Shavit et al. ................. 718/104 |
| 2003/0154115 A1 * | 8/2003 | Lahey et al. ..................... 705/8 |
| 2004/0216105 A1 * | 10/2004 | Burky et al. ................. 718/100 |
| 2005/0132374 A1 * | 6/2005 | Flood et al. .................. 718/100 |
| 2005/0188364 A1 * | 8/2005 | Cockx et al. ................. 717/159 |
| 2006/0020942 A1 * | 1/2006 | Ly et al. ....................... 718/100 |
| 2008/0222634 A1 * | 9/2008 | Rustagi ........................ 718/100 |
| 2009/0125907 A1 * | 5/2009 | Wen et al. .................... 718/101 |

OTHER PUBLICATIONS

Author Unknown, "Multithreaded Programming Guide", SunSoft, Sun Microsystems, Inc., 372 pages, 1995.
Author Unknown, "Multithreaded Programming Guide", SunSoft, Sun Microsystems, Inc., 188 pages, 1994.

* cited by examiner

*Primary Examiner* — Emerson Puente
*Assistant Examiner* — Jonathan R Labud
(74) *Attorney, Agent, or Firm* — Polsinelli PC (57) ABSTRACT

A method for assigning work to a plurality of threads using a primitive data element to partition a work load into a plurality of partitions. A first partition is assigned to a first thread and a second partition is assigned to a second thread of the plurality of threads. A method for improving the concurrency of a multithreaded program by replacing a queue structure storing a plurality of tasks to be performed by a plurality of threads with a partition function. A computer system including a processor unit configured to run a plurality of threads and a system memory coupled to the processor unit that stores a multithreaded program. The multithreaded program workload is partitioned into a plurality of partitions using a primitive data element and a first partition of the plurality of partitions is assigned to a first thread of the plurality of threads for execution.

15 Claims, 7 Drawing Sheets

METHOD FOR MULTITHREADING AN APPLICATION USING PARTITIONING TO ALLOCATE WORK TO THREADS

COPYRIGHT

A portion of the disclosure of this patent document including the code set forth in Appendices I and II, contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Aspects of the present invention relate to multithreading and more particularly to the use of a thread partition model to assign tasks to threads.

BACKGROUND

Multithreaded programming permits concurrent execution of computational tasks to improve application performance. Thread synchronization methods such as semaphores, mutual exclusion locks, and readers/writer locks are generally used to guarantee the atomicity of operations on shared data and to provide a consistent view of memory across concurrently executing threads. Multithreaded programming generally employs a model for assigning computational tasks to threads. Conventional models include creating a thread for each task and a thread pool (a special case of which is the Boss/Worker model). Creating a thread per task may cause performance issues when the frequency of task creation is high and mean task duration is low. A thread pool typically incorporates some form of queue data structure to manage the work/resources assignable to each thread in the pool. This in turn requires some form of synchronization to prevent threads interfering with one another while accessing the queue data structure.

In a thread pool model, a number of threads are created to perform a number of tasks which are usually organized in a queue referred to as a task queue. Typically there are many more tasks than threads. A thread requests the next task from the task queue upon completion of its current task. When all tasks have been completed (i.e., the task queue is empty), the threads can terminate or sleep until new tasks become available.

Thread synchronization mechanisms may cause execution bottlenecks when multiple threads are blocked while attempting to access a protected data structure or code segment. In addition to the overhead (and reduced concurrency) introduced by the use of a synchronization mechanism to parallelize an application, there may be overhead associated with the Thread Pool assignment model employed. The management of work/resources through the use of a queue generally requires synchronization as well. For example, in the Boss/Worker model, a main (Boss) thread performs the task of finding the work (i.e., filling the queue) with the worker threads selecting and completing the work from the queue. Since all worker threads require access to a single queue, synchronized access is generally required to provide a consistent view of the queue data structure among all executing threads. This may result in a performance bottleneck when multiple worker threads are blocked while attempting to access the queue.

Appendix I, which is incorporated herein by reference, shows the source code for matrix multiplication employing a conventional thread pool model of multithreading programming that incorporates the use of work/resource queues. Matrix A has dimensions (N, M) and matrix B has dimensions (M, K) and the results matrix C has dimensions (N, K). The worker threads process individual rows of A and individual columns of B resulting in individual elements of C. The total number of tasks that can be performed in parallel is N*K. It should be noted that matrix multiplication is intrinsically parallel in that the calculation of any of the tasks is independent of all the others. However, use of a queue to manage thread assignment typically reduces concurrency.

When the matrix multiplication is performed, a mutual exclusion (mutex) lock is acquired to ensure that only one matrix multiplication is in progress. A mutex lock typically is used to synchronize threads, usually by ensuring that only one thread at a time executes a critical section of code. The mutex locks are statically initialized to zero before use. The main thread (the boss thread) checks whether its worker threads have been created. If not, it creates one for each CPU.

Once the worker threads have been created, the boss thread sets up a counter of work to do and signals the workers with a condition variable. Each worker thread selects a row and column for the input matrices, then updates the row and column variables so that the next worker thread will get the next row or column or both.

The mutex lock is then released so that computing the vector product can proceed in parallel. When the results are ready, a worker thread reacquires the mutex lock and updates the counter of work completed. The worker thread that completes the last bit of work signals the boss thread that the matrix multiplication is complete.

Porting legacy code to utilize multithreading typically requires significant changes to the legacy code. As the code in Appendix I illustrates, the multithreaded code for matrix multiplication using a queue and locking mechanisms is very different from its single threaded counterpart. The multithreaded version typically involves porting of the single threaded counterpart to insert queue structures and locks to synchronize access to the queue structures. It should be noted that as the number of threads increases, contention for the queue increases due to the increased locking activity. This generally results in less concurrency, a result of using a non-parallel construct (e.g., a queue) to parallelize an application.

Additionally, the number of threads created for the thread pool with a queue structure is a parameter that typically has to be tuned for best performance. The cost of having a larger thread pool is increased resource usage. Additionally, too many threads may hurt performance due to increased context switching overhead while too few threads may not fully utilize all the resources.

What is needed is a method of assigning work to threads that does not require synchronization. What is further needed is a method that eliminates work queues to provide improved concurrency and increased application performance in a multithreaded programming environment.

SUMMARY

One aspect of the present invention involves a method for assigning work to a plurality of threads. The method involves identifying a primitive data attribute and partitioning a work load into a plurality of partitions using the primitive data attribute. The method further involves assigning a first partition of the plurality of partitions to a first thread of the plurality of threads and assigning a second partition of the plurality of partitions to a second thread of the plurality of threads.

Another aspect of the present invention involves a method for improving the concurrency of a multithreaded program. The method involves identifying a queue structure within a multithreaded program that stores a plurality of tasks to be performed by a plurality of threads. The method further involves determining a primitive data attribute that identifies each task of the plurality of tasks and selecting a partition function to assign each task to one of the plurality of threads. The method finally involves replacing the queue structure with the partition function.

Yet, another aspect of the present invention involves a computer readable storage medium. Stored on the computer readable storage medium are computer instructions for partitioning a workload into a plurality of partitions that are executable in parallel and include one or more tasks, computer instructions for creating a plurality of threads, and computer instructions for allocating a first partition of the plurality of partitions to a first thread of the plurality of threads.

Yet, another aspect of the present invention involves a computer system including a processor unit configured to run a plurality of threads of execution and a system memory coupled to the processor unit that stores a multithreaded program. The multithreaded program includes a workload partitioned into a plurality of partitions using a primitive data element. A first partition of the plurality of partitions is assigned to a first thread of the plurality of threads for execution.

DETAILED DESCRIPTION

One aspect of the present invention involves a task assignment model that uses primitive data attributes to partition access to data among an arbitrary number of executing threads. By partitioning the task assignment of work to threads, individual threads may perform tasks within their respective partition without the need for synchronized access to work/resource queues. Reducing the need for thread synchronization during task assignment typically improves concurrency and/or parallelism.

Concurrency exists when at least two threads are in progress at the same time while parallelism exists when at least two threads are executing simultaneously. In a multithreaded process on a single processor, the processor can switch execution resources between threads, resulting in concurrent execution. In the same multithreaded process on a shared memory multiprocessor, each thread in the process can run on a separate processor simultaneously, resulting in parallel execution. However, the use of thread synchronization mechanisms to allocate work among threads may reduce the amount of concurrency and/or parallelism achievable in a multithreaded programming environment.

Figure 1:
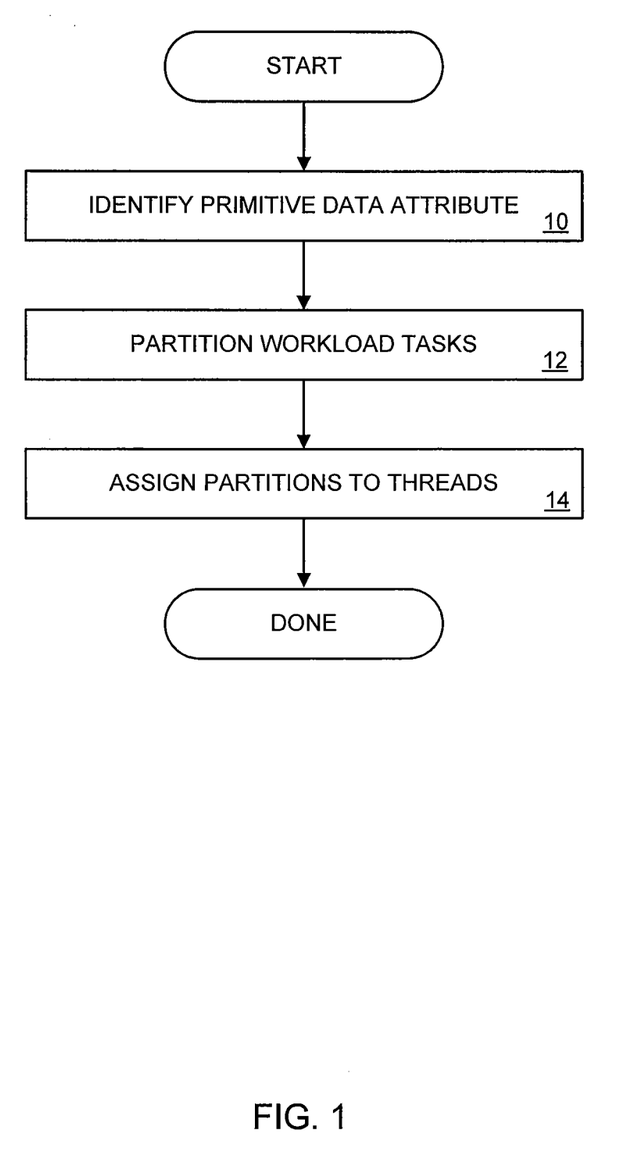
FIG. 1 depicts a flowchart illustrating one method for assigning tasks to a thread pool using a partition model.

FIG. 1 depicts a flowchart illustrating one method for assigning tasks to a thread pool using a partition model. Initially Operation 10 is performed. Operation 10 identifies a primitive data attribute that uniquely identifies each work task to be performed. For example, there may be ten tasks to be completed and two processes (or threads) to perform the work. Each task may be assigned a task ID ranging from one to ten (i.e., the task ID is the primitive data element). Then, Operation 12 is performed.

In Operation 12 the workload is split into a plurality of partitions. The number of partitions may be the same as or different from the number of threads. An appropriate partition function employs the primitive data attribute to assign each task to a particular partition. Each partition may include the same number of tasks or a different number of tasks. Continuing with the example of ten tasks, each assigned a task ID, the partition function may assign odd task IDs to a first partition and even task IDs to a second partition. For example, taking the task ID modulus two may be used as the partition function when partitioning the workload tasks into two partitions. It should be noted that the workload may be split into an arbitrary number of partitions. Then, Operation 14 is performed.

In Operation 14, work partitions are assigned to the available threads. In the above example of ten tasks assigned to two partitions and two threads, the first thread may be assigned the first partition (containing tasks with an odd task ID) and the second thread may be assigned the second partition (containing tasks with an even task ID). That is, each thread typically examines each task and uses the partition function to identify tasks within its assigned partition.

By uniquely identifying each work task, a thread can locate work tasks assigned to it (i.e., within its assigned work partition) and execute the work tasks within its work partition independently of the other threads. Thus, no synchronization mechanism and work queue are required. Each thread generally looks for work by searching for tasks and determining if the tasks are within that particular thread's assigned work partition. That is, looking (searching) for work generally is not partitioned among the executing threads, just doing the work (tasks) is partitioned among the executing threads. Although the locating of work tasks is not generally partitioned, the locating of tasks generally requires less resources than does performing the work tasks. Because the work tasks can be performed without the use of synchronization mechanisms such as semaphores or mutual exclusion locks, partitioning typically provides a gain in performance over conventional approaches to multithreaded programming employing queues and synchronization mechanisms.

Other examples of primitive data attributes that may be used for partitioning (i.e., to uniquely identify the associated data or object to which they are associated) include, but are not limited to, memory address, file inode number, thread ID number, process ID number, memory register number, user account number, matrix row/column number, IP address, Ethernet address, and social security number.

To determine the performance improvement of the partitioning model relative to a conventional multithreading approach, the performance of two multithreaded matrix multiplication programs was measured for a varying number of threads from one to eight threads. One multithreaded version of the matrix multiplication program employs a conventional model of multithreading using a thread pool with a queue structure and mutex locks (to synchronize access to the queue). The other multithreaded version of the matrix multiplication program employs a thread pool with thread partitioning to assign work in accordance with aspects of the present invention.

Figure 2:
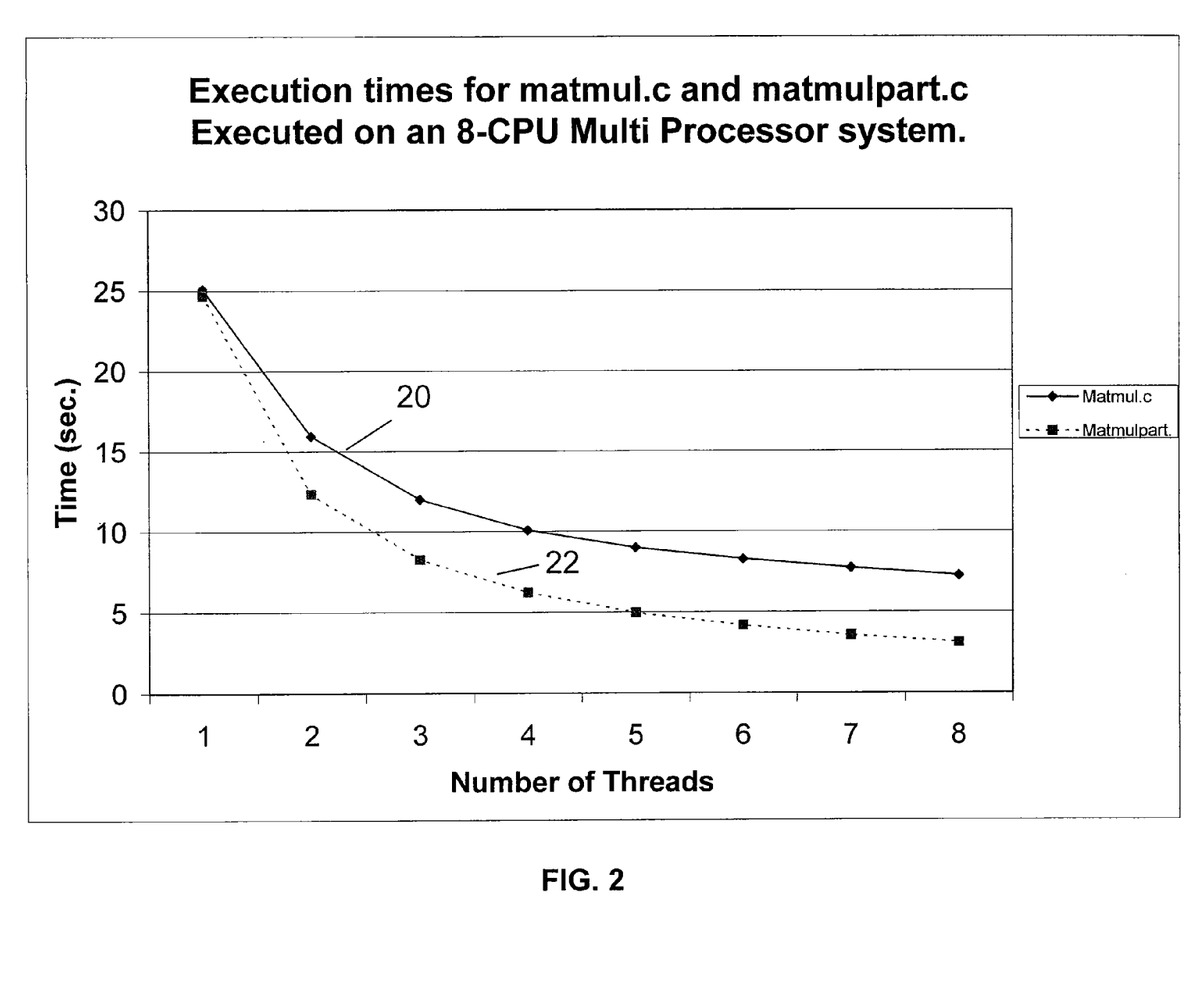
FIG. 2 shows graphs of execution times for multiplying matrices of size 1,000 for a program based on a multithreading model using a Thread Pool and program based on a multithreading model using thread partitioning. Execution times are shown for one to eight threads.
Figure 3:
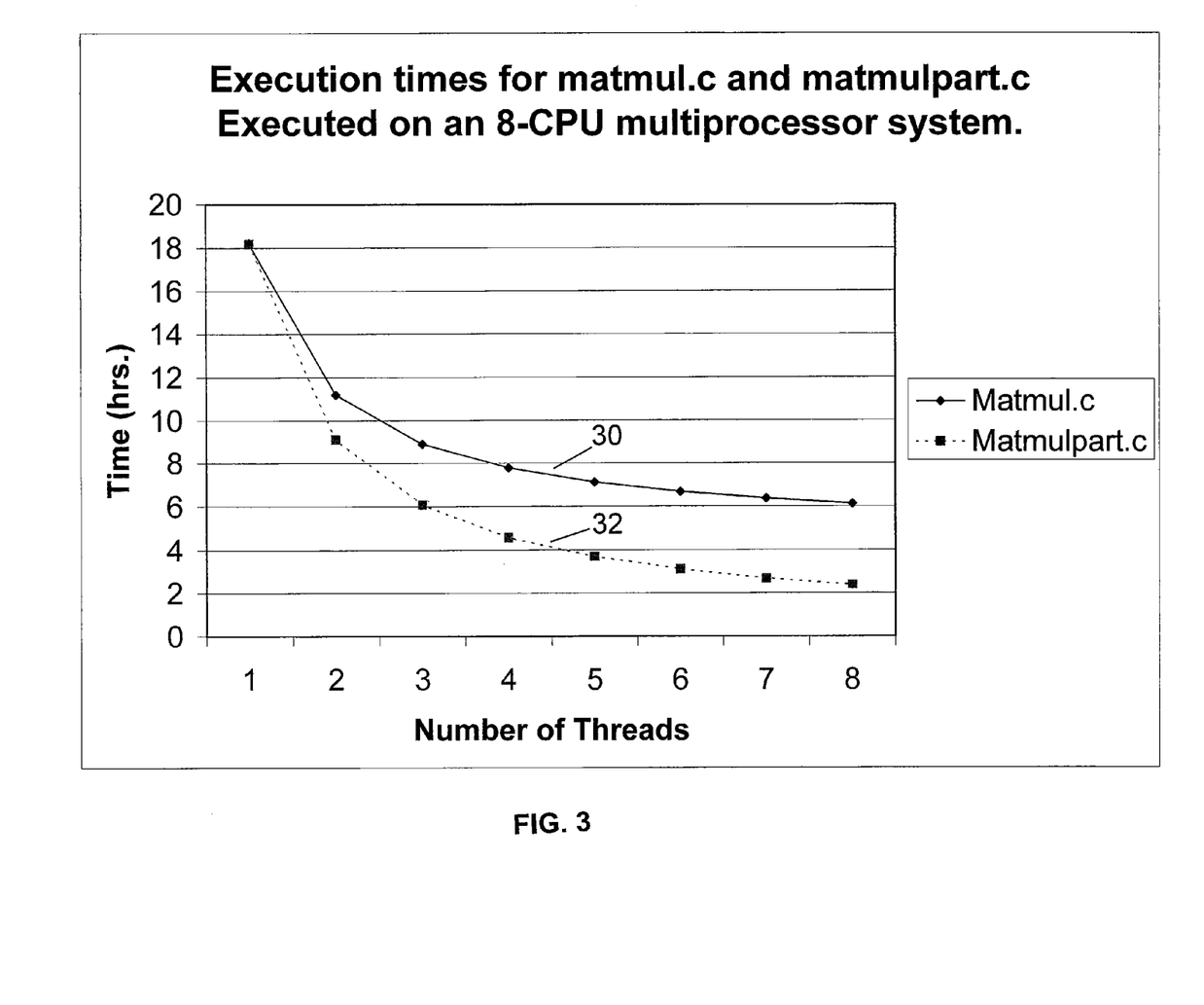
FIG. 3 shows graphs of execution times for multiplying matrices of size 10,000 for a program based on a multithreading model using a Thread Pool and program based on a multithreading model using thread partitioning. Execution times are shown for one to eight threads.

Curve 20 of FIG. 2 shows the execution times for matrix multiplication (matmul) using a conventional thread pool model with a queue where all the matrices A, B and C are square matrices of dimension 1000 for an increasing number of threads up to eight threads. The data was generated on a multiprocessor computer system with 8 CPUs. Similarly, curve 30 of FIG. 3 shows the execution times for matrix multiplication using the conventional thread pool model with a queue for matrices of size 10,000. The data indicates that eight threads provides a speedup of about 3× over one thread (for both size matrices) when the conventional thread pool model with a queue is used.

The use of work queues to synchronize threads looking for work in the conventional multithreaded model may reduce concurrency. That is, all the worker threads require access to a single queue, necessitating synchronized access to provide a consistent view of the queue data structure among all executing threads. As a result, a bottleneck occurs when multiple worker threads are blocked while attempting to access the queue.

One embodiment of the present invention provides improved concurrency and performance by removing the work task queue. The task queue and synchronization mechanism employed in the conventional thread pool model is replaced with a partition model that assigns tasks to threads in the thread pool.

The partitioning model uses a primitive data attribute to partition access to data among an arbitrary number of executing threads. Individual threads only perform tasks in their partition alleviating the need for synchronized access to a task queue. Appendix II, which is incorporated herein by reference, shows the source code for matrix multiplication using a thread pool employing a partition model to replace the work queue. Thread partitioning may be achieved using a Modulus operator to determine which row of the matrix A is processed by a given thread. This mechanism partitions the workload across all threads so that no two threads process the same row of A. Due to the absence of a task queue data structure, thread synchronization is not needed.

That is, use of a partition function generally eliminates the need for synchronization because a task queue is not used to manage/assign work to the threads. It should be noted that the conventional matrix multiplication method uses a boss thread to find work to be done (and subsequently adds it to the task queue) whereas the matrix multiplication using thread partitioning shares the workload required to find work among all the worker threads.

Each worker thread loops over the each row of matrix A (see line 76 of Appendix II) regardless of whether it is required to process that row or not. As a result, there typically is some redundancy introduced in finding work because all of the threads search for work in parallel. However, the combination of searching for work in parallel by all threads and the absence of synchronization when assigning the work to the threads generally provides improved performance. As shown by curve 22 in FIG. 2 and curve 32 of FIG. 3, the partitioning model generally outperforms the conventional thread pool model (shown by curve 20 in FIG. 2 and curve 30 in FIG. 3) for both small and large matrix sizes. In the case of a maximum of 8 threads, the partition model provides a speedup factor of about 2.3 for the 1K matrix example and a speedup factor of about 2.6 for the 10K matrix example.

A thread partitioning model for thread assignment typically leads to higher concurrency because the use of locking buffers for managing resource/task queues is not required. Typically, a small amount of additional code is necessary to partition the threads. The overhead of thread creation is about the same as for a conventional multithreaded programming model.

Figure 4:
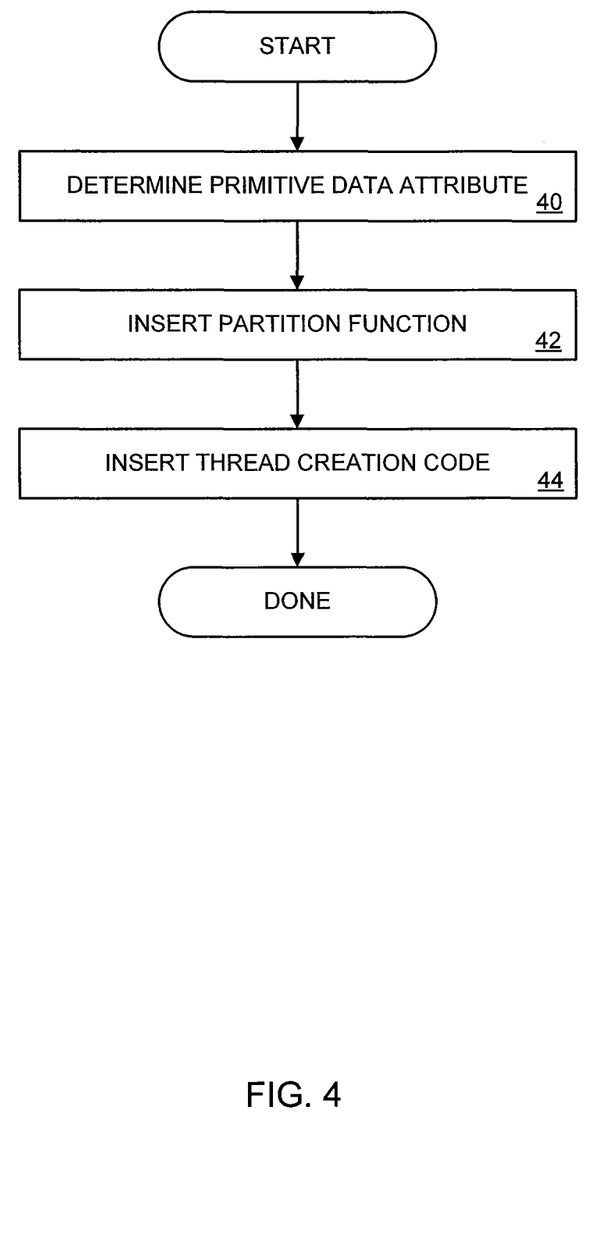
FIG. 4 depicts a flowchart illustrating one method for multithreading a single threaded application.

Multithreading a single-threaded legacy application using a thread pool with a thread partitioning model typically does not require significant code changes to the legacy application. FIG. 4 depicts a flowchart illustrating one method for multithreading a typical single threaded application. Initially, operation 40 is performed. In Operation 40 an appropriate primitive data attribute is determined that uniquely identifies each task of a workload that can be performed in parallel. Then, Operation 42 is performed. During Operation 42, a suitable partition function (based on the primitive data attribute) is inserted into the single-threaded application. The partition function assigns tasks to each thread. Finally, Operation 44 is performed. In Operation 44, code is inserted into the single-threaded application to create a set of threads to perform the workload tasks. It should be noted that the number of threads created may be dynamic based on the number of tasks to be performed. More threads can be created when there are a large number of tasks to be performed in parallel.

Thus, the thread partitioning model may provide an effective means of improving performance of single-threaded legacy applications (that do not employ locking mechanisms) while requiring a minimal amount of code rework. The code in Appendix II illustrates the typical modifications required to multithread a legacy application (here matrix multiplication). In line 78 modulus arithmetic is used to implement the partition function. Other code changes include insertion of code to create and launch the threads of the thread pool. Thus, the thread partition model may be used to solve parallel problems without the need to insert queue mechanisms that generally have an adverse effect on concurrency and parallelization achievable with conventional methods.

The thread partitioning model typically does not require any tuning to optimize performance of the application. In the thread partitioning model every thread behaves as a producer and a consumer so that there is no contention between the rate of production and execution of queued work. In contrast, use of a standard queue mechanism typically results in several regimes of behavior including producer-limited (where the worker output exceeds the producer output and queue size remains small) or consumer-limited (where the producer output exceeds the worker output and queue size is maximized). As a result of these different regimes, optimizing the behavior and tuning of a conventional thread pool model using a queue structure may be difficult. In the partitioning model, the number of available threads is multiplexed across the combined amount of work to be done (comprising production and consumption) and results in load-balancing across all the threads.

The partitioning model typically can be applied to any application. While the above matrix multiplication application used the row number as a means of producing a partition for thread assignment, use of an appropriate primitive data attribute typically permits partitioning of work among the threads without the need for a queue structure. For example, consider the problem of multithreading a grep (global regular expression printer) function to perform a parallel search of a directory hierarchy to locate a particular file. Every directory in the directory hierarchy should be searched. The conventional thread pool model using a queue model employs a Main (Boss) thread to recursively descend the directory hierarchy (usually termed a directory walk) and add the directories found to a work queue. Worker threads then access the work queue to select a directory on which to perform a grep operation (determine of the file is located in that directory).

The thread pool model employing the partitioning model may use the unique file inode number (e.g., stbuf.st_ino for a UNIX file system) to partition work among the threads. Each directory has a unique inode number (i.e., a primitive data attribute of the directory hierarchy). While the partitioning model requires all worker threads to descend the directory hierarchy in parallel, each thread only searches those directories assigned by the partition function. For the directory hierarchy, a suitable thread partition function is as shown:

if ($stbuf.st\_ino \% ((int)ncpus) == thr\_self( ) - 2$)

Figure 5:
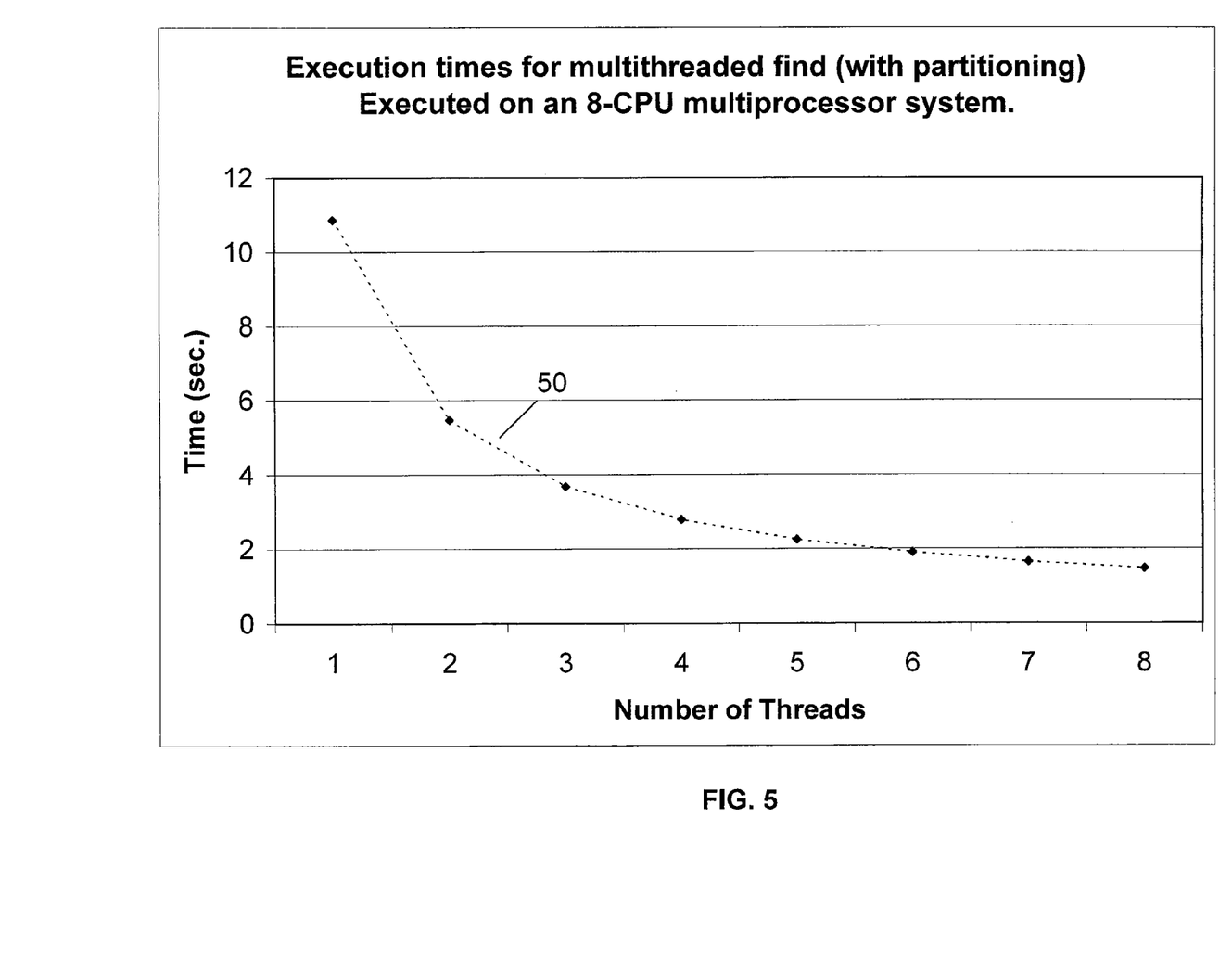
FIG. 5 shows a graph of execution times for a multithreaded grep program employing thread partitioning for one to eight threads.

For example, when there are two threads, one thread searches the directories with even numbered inodes while the other thread searches the directories with odd inode numbers). It should be noted that both threads have to search the entire directory hierarchy to locate work (in this case, directories within their respective work partition). However, each thread can independently search the directories within their work partition. Curve 50 of FIG. 5 shows the execution times of a partitioned version of grep using the above inode primitive data attribute to partition work among the threads. The execution times are shown for an 8-cpu SF25K for different numbers of threads ranging from one to eight.

The new model of thread assignment by thread partitioning may provide improved concurrency for a wide variety of applications to be executed in a multithreaded programming environment. While the above examples illustrate the thread partitioning model of thread assignment for relatively easy problems (because they are intrinsically parallel applications), the model can be applied equally well to more difficult problems. Many applications to be multithreaded typically exhibit a combination of both parallel and sequential traits where thread synchronization is necessary to navigate the sequential sections. A typical example of this is the parallel solution of systems of linear equations. The use of a conventional Thread Pool model using a queue structure typically imposes the burden of thread synchronization beyond what is required to protect the sequential portions of the application and reduces the maximum concurrency achievable in such cases.

The thread partitioning model to assign work may be employed in current multithreaded programs to replace queue structures located in parallel regions of the program (i.e., where a queue structure is used to hold a set of tasks to be performed by the threads). Elimination of such queue structures may result in increased concurrency and/or parallelism.

Figure 6:
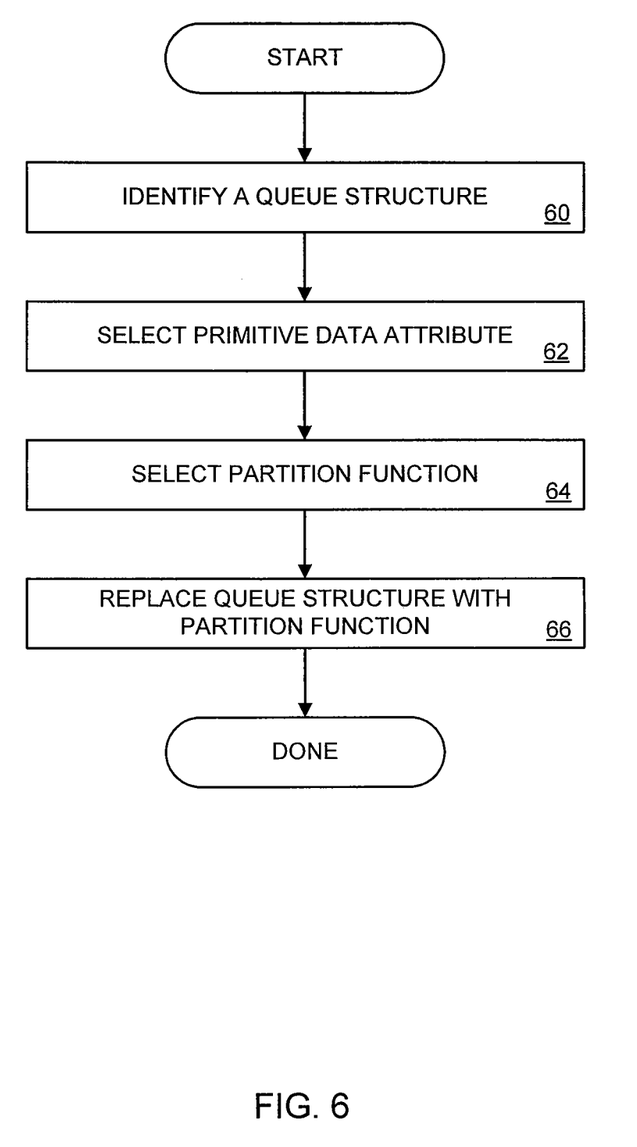
FIG. 6 depicts a flowchart illustrating one method for replacing a queue structure in a multithreaded application with a partition function.

FIG. 6 depicts a flowchart illustrating one method for replacing a queue structure of a multithreaded application with a partition function. Replacing the queue structure typically leads to improved concurrency and/or parallelism by eliminating thread contention for queue access. Initially, Operation 60 is performed. In Operation 60 an appropriate queue structure is identified. An appropriate queue structure is one that stores tasks to be executed by the available threads (e.g., any of the executing threads in a thread pool). Then, Operation 62 is performed.

In Operation 62, an appropriate primitive data attribute is selected. The primitive data attribute uniquely identifies each task. Then, Operation 64 is performed.

In Operation 64 a partition function is selected. The partition function typically divides the workload of tasks into partitions such that each task is allocated to only one partition and such that all of the tasks have been allocated. Then, Operation 66 is performed.

In Operation 66, the queue structure is replaced with the partition function. This allows each executing thread to locate tasks in parallel with the other threads (look for work) and identify assigned tasks by using the partition function rather than having each thread acquire access to the queue to obtain a task. Because each task of the workload is located in only one partition, no synchronization is required to prevent one thread from working on the same task as another thread. That is, the thread synchronization mechanism used to protect the queue may also be removed.

The described invention may be provided as a computer program product, or software, that may include a machine readable storage medium having stored thereon instructions, which may be used to program a computer system (or other electronic devices) to perform a process according to the present invention. The machine readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other type of medium for storing electronic instructions.

Figure 7:
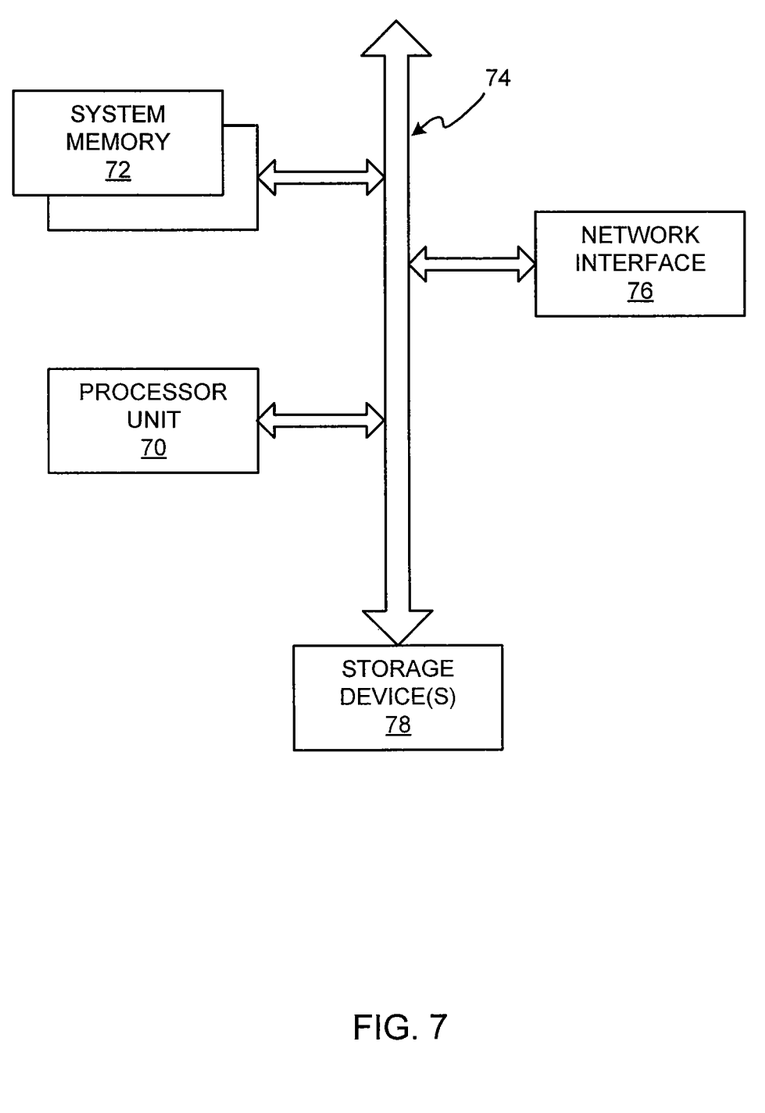
FIG. 7 depicts a computer system that may execute a multithreaded program utilizing a thread partition model to assign tasks to the threads.

FIG. 7 depicts a computer system that may execute a multithreaded program utilizing a thread partition model to assign tasks to the threads. The computer system includes a processor unit 70 (possibly including multiple processors, a multithreaded processor, a multi-core processor, etc.). The computer system also includes a system memory 72 (e.g., one or more of cache, SRAM, DRAM, DDR RAM, EEPROM, etc.), a system bus 74 (e.g., PCI, ISA, etc.), a network interface 76 (e.g., an ATM interface, an Ethernet interface, a Frame Relay interface, etc.) and a storage device 78 (e.g., optical storage, magnetic storage, etc.). The computer system may include fewer or additional components not depicted in FIG. 7 (e.g., video cards, audio cards, peripheral devices, etc.). The processor unit 70, the storage device 78, the network interface 76 and the system memory 72 are coupled to the system bus 74.

While the invention has been described with reference to various realizations, it will be understood that these realizations are illustrative and that the scope of the invention is not limited to them. Many variations, modifications, additions, and improvements are possible. For example, while embodiments of the present invention have been illustrated using a partition function to replace a queue structure, this is by way of illustration only and not limitation. The partition function using primitive data attributes to assign threads may be used to remove any non-parallel construct around a set of tasks that can be performed in parallel. Accordingly, the proper scope of the present invention is specified by the following claims and not by the preceding examples.

APPENDIX I

```
1    #include <stdio.h>
2    #include <string.h>
3    #include <fcntl.h>
4    #include <sys/types.h>
5    #include <sys/stat.h>
6    #include <dirent.h>
7    #include <libgen.h>
8    #include <thread.h>
9    #include <synch.h>
10   #include <errno.h>
11   #include <time.h>
12   #include <sys/times.h>
13
14
15   struct work {
16       mutex_t lock;
17       cond_t start_cond, done_cond;
18       int **m1, **m2, **m3;
19       int row, col;
20       int todo, notdone, workers;
21   } w;
22
23   mutex_t mul_lock;
24   int **imatrix(int, int, int, int);
25   void print_matrix(int **);
26   void nrerror(char *);
27   void matmul(int **,int **,int **);
28   void *worker(void *);
29   /* timing */
30   static void pr_times(clock_t, struct tms*, struct tms*);
31   struct tms tmsstart, tmsend;
32   clock_t     start, end;
33   int         status, count;
34   time_t start=0;
35   time_t end=0;
36   int ncpu, nproc;
37   int SIZE;
38
39   main(int argc, char *argv[ ])
40   {
41       1int **m1, **m2, **m3;
42           SIZE = atoi(argv[1])
43       m1 = imatrix(0, SIZE, 0, SIZE);
44       m2 = imatrix(0, SIZE, 0, SIZE);
45       m3 = imatrix(0, SIZE, 0, SIZE);
46
47       /* print_matrix(m1); */
48           nproc = sysconf(_SC_NPROCESSORS_ONLN);
49           ncpu = atoi(argv[2]);
50
51       printf("Max no of processors = %Id\n", nproc);
52           printf("Size of Matrix = %Id\n", SIZE);
53           printf("Number of threads = %Id\n", ncpu);
54
55       if ((start = times(&tmsstart)) == -1)/*starting time values*/
56           perror("times error");
57
58       matmul(m1, m2, m3);
59           if ((end = times(&tmsend)) == -1)/*ending time values*/
60               perror("times error");
61
62       pr_times(end-start, &tmsstart, &tmsend);
63
64   }
65   void matmul(int **m1, int **m2, int **m3)
66   {
67       int i;
68
69       /* Acquire matrix multiply lock */
70       mutex_lock(&mul_lock);
71
72       /* Acquire worker lock */
73       mutex_lock(&w.lock);
74       if (w.workers == 0) {
75           /* If there are no workers create one worker thread for each CPU */
76           for (i = 0; i < ncpu; i++) {
77               thr_create(NULL, NULL, worker, (void *)NULL, THR_DETACHED, NULL);
78           }
79           w.workers = ncpu;
80       }
```

APPENDIX I-continued

```
81          w.m1 = m1;
82          w.m2 = m2;
83          w.m3 = m3;
84          w.row = w.col = 0;
85          w.todo = w.notdone = SIZE*SIZE;
86          cond_broadcast(&w.start_cond);
87          while (w.notdone)
88              cond_wait(&w.done_cond, &w.lock);
89          mutex_unlock(&w.lock);
90          mutex_unlock(&mul_lock);
91      }
92
93      void *worker(void *arg)
94      {
95          int **m1, **m2, **m3;
96          int row, col, i, result;
97
98          while (1) {
99              mutex_lock(&w.lock);
100             while (w.todo == 0)
101                 /* Wait for start_cond to be non-zero */
102                 cond_wait(&w.start_cond, &w.lock);
103             w.todo--;
104             m1 = w.m1;
105             m2 = w.m2;
106             m3 = w.m3;
107             row = w.row;
108             col = w.col;
109             w.col++;
110             if (w.col == SIZE) {
111                 w.col = 0;
112                 w.row++;
113                 if (w.row == SIZE)
114                     w.row=0;
115             }
116
117             /* release the lock now for other workers */
118             mutex_unlock(&w.lock);
119
120             /* get the result */
121             result = 0;
122             for (1=0; i<SIZE; i++)
123                 result += m1[row] [i] * m2[i] [col];
124             m3[row][col] = result;
125
126             /* lock the work structure and update */
127             mutex_lock(&w.lock);
128             w.notdone--;
129
130             /* Signal the calling thread when all is done */
131             if (w.notdone == 0)
132                 cond_signal(&w.done_cond);
133
134             /* release the lock */
135             mutex_unlock(&w.lock);
136         }
137     }
138
139     void print_matrix(int **m)
140     {
141         int i, j;
142         for (i=0; i<SIZE; i++) {
143             for(j=0; j<SIZE; j++)
144                 printf("%d ", m[i] [j]);
145             printf("\n");
146         }
147     }
148
149     int **imatrix(int nrl, int nrh, int ncl, int nch)
150     {
151         int i, **m;
152
153         /* Allocate pointers to rows */
154         m = (int **)malloc((unsigned) (nrh-nrl+1)*sizeof(int*));
155         if (!m) nrerror("allocation failure 1 in imatrix( )");
156         m -= nrl;
157
158         /* Allocate rows and set pointers to them */
159         for (i=nrl; i<=nrh; i++) {
160             m[i] = (int *)malloc((unsigned) (nch-ncl+1)*sizeof(int));
```

APPENDIX I-continued

```
161             if (!m[i]) nrerror("allocation failure 2 in imatrix( )");
162             m[i] −= ncl;
163         }
164
165         /*Return pointer to array of pointers to rows */
166         return m;
167     }
168
169     void nrerror(char error_text[ ])
170     {
171         void exit( );
172
173         fprintf(stderr, "Numerical run-time error...\n");
174         fprintf(stderr, "%s\n", error_text);
175         exit(1);
176     }
177
178     static void pr_times(clock_t real, struct tms *tmsstart, struct tms *tmsend)
179     {
180         static long clktck = 0;
181         if (clktck == 0)    /* fetch clock ticks per second first time */
182             if ((clktck = sysconf(_SC_CLK_TCK)) < 0)
183                 perror("sysconf error");
184         fprintf(stdout, " real %7.2f\n", real / (double) clktck);
185     /*
186     * fprintf(stderr, " user: %7.2f\n",
187         (tmsend->tms_utime − tmsstart->tms_utime) / (double) clktck);
188         fprintf(stderr, " sys: %7.2f\n",
189         (tmsend->tms_stime − tmsstart->tms_stime) / (double) clktck);
190     */
191     }
192
```

APPENDIX II

```
1     #include <stdio.h>
2     #include <string.h>
3     #include <fcntl.h>
4     #include <sys/types.h>
5     #include <sys/stat.h>
6     #include <dirent.h>
7     #include <libgen.h>
8     #include <thread.h>
9     #include <synch.h>
10    #include <errno.h>
11    #include <time.h>
12    #include <sys/times.h>
13
14    int ncpu, nproc;
15    int **m1, **m2, **m3;
16    int row, col;
17
18    int **m1, **m2, **m3;
19    int **imatrix(int, int, int, int);
20    void print_matrix(int **);
21    void nrerror(char *);
22    void *worker(void *);
23    static void pr_times(clock_t, struct tms *, struct tms *);
24    /* timing */
25    struct    tms tmsstart, tmsend;
26    clock_t   start, end;
27    int       status, count;
28    time_t start=0;
29    time_t end=0;
30    int SIZE;
31
32    main(int argc, char *argv[ ])
33
34    {
35        int i;
36        SIZE = atoi(argv[1]);
37            thread_t main_thr=thr_self( );
38
39        m1 = imatrix(0, SIZE, 0, SIZE);
40        m2 = imatrix(0, SIZE, 0, SIZE);
41        m3 = imatrix(0, SIZE, 0, SIZE);
42
```

APPENDIX II-continued

```
43          /* print_matrix(m1); */
44
45          nproc = sysconf(_SC_NPROCESSORS_ONLN);
46          ncpu = atoi(argv[2]);
47
48          printf("Max no of processors= %ld\n", nproc);
49          printf("Size of Matrix = %ld\n" , SIZE);
50          printf("Number of threads = %ld\n" , ncpu);
51
52              if ((start = times(&tmsstart)) == −1)    /*starting time values */
53                  perror("times error");
54
55              /* If there are no workers create one worker thread for each CPU */
56              for (i=0; i<ncpu; i++) {
57                  thr_create(NULL, NULL, worker, (void *)NULL, THR_DETACHED, NULL);
58              }
59
60              /* wait for threads to compete */
61              while (thr_join(0, NULL, NULL) == 0);
62              printf("main( ) reporting that all %ld threads have terminated\n", ncpu);
63
64              if ((end = times(&tmsend)) == −1)              /* ending time values */
65                  perror("times error");
66
67              pr_times(end-start, &tmsstart, &tmsend);
68              thr_exit((void *)main_thr);             /* exit the main thread */
69
70      }
71
72      void *worker(void *arg)
73      {
74          int row, col, k, result;
75
76          for (row=0; row<SIZE; row++) {
77              /* Here's the partition function */
78              if (row %((int) ncpu) == thr_self( )−2) {
79              /* printf("Row %d serviced by thread %d\n", row+1, thr_self( )); */
80                  for (col=0; col<SIZE; col++) {
81                      result = 0;
82                      for (k=0; k<SIZE; k++) {
83                          result += m1[row][k] * m2[k][col];
84                      }
85                      m3[row][col] = result;
86                  }
87              }
88          }
89      }
90
91      void print_matrix(int **m)
92      {
93          int i, j;
94          for (i=0; i<SIZE; i++) {
95              for (j=0; j<SIZE; j++)
96                  printf("%d", m[i][j]);
97              printf("\n");
98          }
99      }
100
101     int **imatrix(int nrl, int nrh, int ncl, int nch)
102     {
103         int i, **m;
104
105         /* Allocate pointers to rows */
106         m = (int**)malloc((unsigned) (nrh−nrl+1)*sizeof(int*));
107         if (!m) nrerror("allocation failure 1 in imatrix( )");
108         m −= nrl;
109
110         /* Allocate rows and set pointers to them */
111         for (i=nrl; i<=nrh ;i++) {
112             m[i] = (int *)malloc((unsigned) (nch−ncl+1)*sizeof(int));
113             if (!m[i]) nrerror("allocation failure 2 in imatrix( )");
114             m[i] −= ncl;
115         }
116
117         /* Return pointer to array of pointers to rows */
118         return m;
119     }
120
121     void nrerror(char error_text[ ])
122     {
```

APPENDIX II-continued

```
123      void exit( );
124
125      fprintf(stderr, "Numerical run-time error...\n");
126      fprintf(stderr, "%s\n", error_text);
127      exit(1);
128    }
129
130    static void
131    pr_times(clock_t real, struct tms *tmsstart, struct tms *tmsend)
132    {
133        static long clktck = 0;
134        if (clktck == 0) /* fetch clock ticks per second first time */
135            if ((clktck = sysconf(_SC_CLK_TCK)) < 0)
136                perror("sysconf error");
137        fprintf(stdout, " real %7.2f\n", real / (double) clktck);
138    /* fprintf(stderr, " user: %7.2f\n",
139        (tmsend->tms_utime - tmsstart->tms_utime) / (double) clktck);
140        fprintf(stderr, " sys: %7.2f\n",
141        (tmsend->tms_stime - tmsstart->tms_stime) / (double) clktck);
142    */
143    }
144
```

What is claimed is:

1. A method for improving the concurrency of a multi-threaded program, comprising:
   identifying a queue structure within a multithreaded program, the queue structure storing a plurality of tasks to be performed by a plurality of threads;
   determining a primitive data attribute, the primitive attribute operable to identify each task of the plurality of tasks;
   selecting a partition function, the partition function operable to assign each task to one of the plurality of threads; and
   replacing the queue structure and a corresponding synchronization mechanism for the queue structure with the partition function.

2. The method of claim 1, wherein the primitive data attribute uniquely identifies each one of the plurality, of tasks.

3. The method of claim 2, wherein the primitive data attribute is selected from the group consisting of file inode number, process identification number, memory address, user account number, Internet protocol address, Ethernet address, and social security number.

4. The method of claim 1, wherein the partition function is further operable to partition the plurality of tasks into partitions containing approximately the same number of tasks.

5. The method of claim 1, wherein each thread of the plurality of threads identifies each task of the plurality of tasks assigned to it using the partition function.

6. A system for improving the concurrency of a multi-threaded program, comprising:
   at least one processor to:
      identify a queue structure within a multithreaded program, the queue structure storing a plurality of tasks to be performed by a plurality of threads;
      determine a primitive data attribute, the primitive attribute operable to identify each task of the plurality of tasks;
      select a partition function, the partition function operable to assign each task to one of the plurality of threads; and
      replace the queue structure and a corresponding synchronization mechanism for the queue structure with the partition function.

7. The system of claim 6, wherein the primitive data attribute uniquely identifies each one of the plurality of tasks.

8. The system of claim 6, wherein the primitive data attribute is selected from the group consisting of file inode number, process identification number, memory address, user account number, Internet protocol address, Ethernet address, and social security number.

9. The system of claim 6, wherein the partition function is further operable to partition the plurality of tasks into partitions containing approximately the same number of tasks.

10. The system of claim 6, wherein each thread of the plurality of threads identifies each task of the plurality of tasks assigned to it using the partition function.

11. A non-transitory computer readable medium encoded with instructions for improving the concurrency of a multi-threaded program, the instructions executable by a processor, comprising:
   identifying a queue structure within a multithreaded program, the queue structure storing a plurality of tasks to be performed by a plurality of threads;
   determining a primitive data attribute, the primitive attribute operable to identify each task of the plurality of tasks;
   selecting a partition function, the partition function operable to assign each task to one of the plurality of threads; and
   replacing the queue structure and a corresponding synchronization mechanism for the queue structure with the partition function.

12. The non-transitory computer readable medium of claim 11, wherein the primitive data attribute uniquely identifies each one of the plurality of tasks.

13. The non-transitory computer readable medium of claim 11, wherein the primitive data attribute is selected from the group consisting of file inode number, process identification number, memory address, user account number, Internet protocol address, Ethernet address, and social security number.

14. The non-transitory computer readable medium of claim 11, wherein the partition function is further operable to partition the plurality of tasks into partitions containing approximately the same number of tasks.

15. The non-transitory computer readable medium of claim 11, wherein each thread of the plurality of threads identifies each task of the plurality of tasks assigned to it using the partition function.

* * * * *